US011521016B2

(12) United States Patent
Fan et al.

(10) Patent No.: US 11,521,016 B2
(45) Date of Patent: Dec. 6, 2022

(54) METHOD AND APPARATUS FOR GENERATING INFORMATION ASSESSMENT MODEL

(71) Applicant: Baidu Online Network Technology (Beijing) Co., Ltd., Beijing (CN)

(72) Inventors: Miao Fan, Beijing (CN); Sen Ye, Beijing (CN); Chao Feng, Beijing (CN); Mingming Sun, Beijing (CN); Ping Li, Beijing (CN); Haifeng Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 565 days.

(21) Appl. No.: 16/700,593

(22) Filed: Dec. 2, 2019

(65) Prior Publication Data

US 2020/0401852 A1 Dec. 24, 2020

(30) Foreign Application Priority Data

Jun. 20, 2019 (CN) .......................... 201910537150.9

(51) Int. Cl.
*G06K 9/00* (2022.01)
*G06K 9/62* (2022.01)
*G06N 20/10* (2019.01)
*G06N 3/04* (2006.01)
*G06N 20/20* (2019.01)
*G06N 3/08* (2006.01)

(52) U.S. Cl.
CPC ......... *G06K 9/6259* (2013.01); *G06K 9/6228* (2013.01); *G06N 3/0454* (2013.01); *G06N 3/084* (2013.01); *G06N 20/10* (2019.01); *G06N 20/20* (2019.01)

(58) Field of Classification Search
CPC .... G06K 9/6259; G06K 9/6228; G06N 20/20; G06N 20/10; G06N 3/0454; G06N 3/084
See application file for complete search history.

(56) References Cited

U.S. PATENT DOCUMENTS

| 2011/0173191 A1* | 7/2011 | Tsaparas ............... G06F 16/313 |
| | | 707/E17.084 |
| 2020/0094824 A1* | 3/2020 | Schulter .................. G06F 30/27 |
| 2020/0278976 A1* | 9/2020 | Fan ................... G06F 16/24573 |

* cited by examiner

*Primary Examiner* — Khai M Nguyen
(74) *Attorney, Agent, or Firm* — Nixon Peabody LLP

(57) ABSTRACT

Embodiments of the present disclosure provide a method for generating an information assessment model, a method for determining the usefulness of comment information, apparatus, electronic device, and computer-readable medium. The method may include: acquiring training samples, the training samples including first sample comment information with a usefulness label and second sample comment information without a usefulness label; acquiring a predictor model and a discriminator model respectively constructed based on a generative network and a discrimination network in a generative adversarial network, and pre-training the predictor model using the first sample comment information, the predictor model being used to predict a usefulness label of a piece of comment information, the discriminator model being used to discriminate authenticity of a usefulness label; and training the predictor model and the discriminator model by iteratively performing a plurality of times of training operations, using the trained predictor model as an information assessment model.

20 Claims, 7 Drawing Sheets

METHOD AND APPARATUS FOR GENERATING INFORMATION ASSESSMENT MODEL

CROSS-REFERENCE TO RELATED APPLICATIONS

This application claims priority to Chinese Patent Application No. 201910537150.9, filed with the China National Intellectual Property Administration (CNIPA) on Jun. 20, 2019, the contents of which are incorporated herein by reference in their entirety.

TECHNICAL FIELD

Embodiments of the present disclosure relate to the field of computer technology, specifically to the field of network information processing technology, and more specifically to a method and apparatus for generating an information assessment model.

BACKGROUND

With the development of Internet technology, Internet users and Internet products are continuously increasing, and network users' comments on Internet products grows explosively. During browsing Internet information, users often refer to other users' comments to conduct behavioral decisions. For example, users may refer to comments on products to make consumption decisions.

However, since the comments in networks are uneven in quality and huge in quantity, it is difficult to efficiently filter out valuable comments from the large number of comments for references. Therefore, assessment on the values of the comments is in demand. The conventional method is to set, by crowdsourcing, a series of voting buttons to request other users to vote on the values of the comments. By this method, a small number of voting results may be collected.

SUMMARY

Embodiments of the present disclosure provide a method and apparatus for generating an information assessment model, and a method and apparatus for determining the usefulness of comment information, and electronic device and computer-readable medium.

According to a first aspect, some embodiments of the present disclosure provide a method for generating an information assessment model, including: acquiring training samples, the training samples comprising first sample comment information with a usefulness label and second sample comment information without a usefulness label; acquiring a predictor model and a discriminator model respectively constructed based on a generative network and a discrimination network in a generative adversarial network, and pre-training the predictor model using the first sample comment information, the predictor model being used to predict a usefulness label of a piece of comment information, the discriminator model being used to discriminate authenticity of a usefulness label; and training the predictor model and the discriminator model by iteratively performing a plurality times of training operations, using the trained predictor model as an information assessment model; where a training operation including: predicting a usefulness label of the second sample comment information using the predictor model; using the usefulness label of the first sample comment information as a real label, using the usefulness label of the second sample comment information as a false label, discriminating authenticity of the usefulness label of the first sample comment information and authenticity of the usefulness label of the second sample comment information by using the discriminator model; iteratively updating, based on an error of the discrimination result of the discriminator model, a parameter of the discriminator model and a reward function, the reward function being associated with the parameter of the discriminator model and a parameter of the predictor model; determining a desired reward of the predictor model based on the reward function and the predictor model, and iteratively updating the parameter of the predictor model based on an error of the desired reward.

In some embodiments, the discriminating authenticity of the usefulness label of the first sample comment information and authenticity of the usefulness label of the second sample comment information by using the discriminator model includes: selecting usefulness labels of an equal number of first sample comment information and second sample comment information, and discriminating authenticity of the selected usefulness labels by using the discriminator model.

In some embodiments, the error of the discrimination result of the discriminator model comprises a sum of an opposite number of a first cross entropy and an opposite number of a second cross entropy; the first cross entropy comprises: a cross entropy between a first probability distribution of that the usefulness label of the first sample comment information is a real label and a second probability distribution of that the discriminator model discriminates the usefulness label of the first sample comment information as a real label; the second cross entropy comprises: a cross entropy between a third probability distribution of that the usefulness label of the second sample comment information predicted by the predictor model is a real label and a fourth probability distribution of that the discriminator model discriminates the usefulness label of the second sample comment information as a real label.

In some embodiments, when an input of the reward function is the second sample comment information, an output is a result of authenticity discrimination by the discriminator model for the usefulness label of the second sample comment information; the determining a desired reward of the predictor model based on the reward function and the predictor model, and iteratively updating the parameter of the predictor model based on an error of the desired reward comprises: multiplying the reward function by a prediction result of the predictor model to calculate the desired reward, and iteratively updating, in response to determining that the desired reward does not reach a preset reward value condition, the parameter of the predictor model.

In some embodiments, when an input of the reward function is the second sample comment information, an output is a result of authenticity discrimination by the discriminator model for the usefulness label of the second sample comment information; and the determining a desired reward of the predictor model based on the reward function and the predictor model, and iteratively updating the parameter of the predictor model based on an error of the desired reward comprises: multiplying the reward function by a prediction result of the predictor model to calculate the desired reward, and iteratively updating, in response to determining that the desired reward does not reach a preset reward value condition, the parameter of the predictor model.

In some embodiments, the first sample comment information also has a usefulness index label, the usefulness index label is used to characterize a degree of usefulness, and the predictor model is also used to predict a usefulness index label of a piece of comment information; the operation also includes: predicting a usefulness index label of the second sample comment information using the predictor model; and determining a prediction error of the predictor model for the usefulness index label; and the iteratively updating the parameter of the predictor model based on an error of the desired reward includes: iteratively updating the parameter of the predictor model based on the error of the desired reward and the prediction error of the predictor model for the usefulness index label alternately.

In some embodiments, the method further includes: acquiring comment object information corresponding to the training samples; the predictor model comprises an information preprocessing network and a classification network; where the information preprocessing network is used to convert a training sample and comment object information corresponding thereto into a mathematical representation, and the classification network predicts usefulness label of the training sample based on the mathematical representation.

In some embodiments, the information preprocessing network comprises a first bi-directional long short-term memory network and a second bi-directional long short-term memory network; the first bi-directional long short-term memory network converts the training sample into a first vector representation, and the second bi-directional long short-term memory network converts the comment object information corresponding to the training sample into a second vector representation; the information preprocessing network integrates, based on an attention mechanism, the first vector representation of the training sample and the second vector representation of the comment object information corresponding thereto into the mathematical representation corresponding to the training sample.

According to a second aspect, some embodiments of the present disclosure provide a method for determining the usefulness of comment information, including: acquiring a set of comment information; and inputting the comment information in the set of comment information into the information assessment model generated by the method for generating an information assessment model according to the first aspect, to obtain usefulness labels of the comment information.

In some embodiments, the method further includes: presenting, based on the usefulness labels of the comment information, the comment information in the set of comment information.

According a third aspect, some embodiments of the present disclosure provide an apparatus for generating an information assessment model, including: presenting, based on the usefulness labels of the comment information, the comment information in the set of comment information; a preprocessing unit, configured to acquire a predictor model and a discriminator model respectively constructed based on a generation network and a discrimination network in a generative adversarial network, and pre-train the predictor model using the first sample comment information, the predictor model being used to predict a usefulness label of a piece of comment information, the discriminator model being used to discriminate authenticity of a usefulness label; and a training unit, configured to train the predictor model and the discriminator model by iteratively performing a plurality times of training operations, using the trained predictor model as an information assessment model; where a training operation includes: predicting a usefulness label of the second sample comment information using the predictor model; using the usefulness label of the first sample comment information as a real label, using the usefulness label of the second sample comment information as a false label, discriminating authenticity of the usefulness label of the first sample comment information and authenticity of the usefulness label of the second sample comment information by using the discriminator model; iteratively updating, based on an error of the discrimination result of the discriminator model, a parameter of the discriminator model and a reward function, the reward function being associated with the parameter of the discriminator model and a parameter of the predictor model; determining a desired reward of the predictor model based on the reward function and the predictor model, and iteratively updating the parameter of the predictor model based on an error of the desired reward.

In some embodiments, the training unit is configured to discriminate authenticity of the usefulness label of the first sample comment information and authenticity of the usefulness label of the second sample comment information by using the discriminator model in the training operation as follows: selecting usefulness labels of an equal number of first sample comment information and second sample comment information, and discriminating authenticity of the selected usefulness labels by using the discriminator model.

In some embodiments, the error of the discrimination result of the discriminator model comprises a sum of an opposite number of a first cross entropy and an opposite number of a second cross entropy; the first cross entropy comprises: a cross entropy between a first probability distribution of that the usefulness label of the first sample comment information is a real label and a second probability distribution of that the discriminator model discriminates the usefulness label of the first sample comment information as a real label; and the second cross entropy comprises: a cross entropy between a third probability distribution of that the usefulness label of the second sample comment information predicted by the predictor model is a real label and a fourth probability distribution of that the discriminator model discriminates the usefulness label of the second sample comment information as a real label.

In some embodiments, when an input of the reward function is the second sample comment information, an output is a result of authenticity discrimination by the discriminator model for the usefulness label of the second sample comment information; and the training unit is configured to determine the desired reward of the predictor model in the training operation, and iteratively update the parameter of the predictor model based on an error of the desired reward as follows: selecting usefulness labels of an equal number of first sample comment information and second sample comment information, and discriminating authenticity of the selected usefulness labels by using the discriminator model.

In some embodiments, when the input of the reward function is the first sample comment information and the discriminator model discriminates the usefulness label of the first sample comment information as a real label, the value of the reward function is 1; when the input of the reward function is the first sample comment information and the discriminator model discriminates the usefulness label of the first sample comment information as a false label, the value of the reward function is 0.

In some embodiments, the first sample comment information also has a usefulness index label, the usefulness index label is used to characterize a degree of usefulness, and the predictor model is also used to predict a usefulness index label of a piece of comment information; the training operation performed by the training unit also comprises: predicting a usefulness index label of the second sample comment information using the predictor model; and determining a prediction error of the predictor model for the usefulness index label; and the training unit is configured to iteratively update the parameter of the predictor model in the training operation as follows: iteratively updating the parameter of the predictor model based on the error of the desired reward and the prediction error of the predictor model for the usefulness index label alternately.

In some embodiments, the first acquiring unit is also configured to acquire comment object information corresponding to the training samples; and the predictor model comprises an information preprocessing network and a classification network; where the information preprocessing network is used to convert a training sample and comment object information corresponding thereto into a mathematical representation, and the classification network predicts usefulness label of the training sample based on the mathematical representation.

In some embodiments, the information preprocessing network comprises a first bi-directional long short-term memory network and a second bi-directional long short-term memory network; the first bi-directional long short-term memory network converts the training sample into a first vector representation, and the second bi-directional long short-term memory network converts the comment object information corresponding to the training sample into a second vector representation; the information preprocessing network integrates, based on an attention mechanism, the first vector representation of the training sample and the second vector representation of the comment object information corresponding thereto into the mathematical representation corresponding to the training sample.

According to a fourth aspect, some embodiments of the present disclosure provide an apparatus for determining the usefulness of comment information, including: a second acquiring unit, configured to acquire a set of comment information; an assessing unit, configured to input the comment information in the set of comment information into the information assessment model generated by the method for generating an information assessment model according to the first aspect, to obtain usefulness labels of the comment information.

In some embodiments, the apparatus further includes: a presenting unit, configured to present, based on the usefulness labels of the comment information, the comment information in the set of comment information.

According to fifth aspect, some embodiments of the present disclosure provide an electronic device, the electronic device including: one or more processors; and a storage apparatus, configured to store one or more programs, where the one or more programs, when executed by the one or more processors, cause the one or more processors to implement the method according to the first aspect.

According to sixth aspect, some embodiments of the present disclosure provide a computer readable medium, where the program, when executed by a processor, causes the processor to implement the method according to the first aspect.

The method and apparatus for generating an information assessment model according to some embodiments of the present disclosure, first acquires training samples, the training samples comprising first sample comment information with a usefulness label and second sample comment information without a usefulness label; then acquires a predictor model and a discriminator model respectively constructed based on a generative network and a discrimination network in a generative adversarial network, and pre-trains the predictor model using the first sample comment information, the predictor model being used to predict a usefulness label of a piece of comment information, the discriminator model being used to discriminate authenticity of a usefulness label; and after that, trains the predictor model and the discriminator model by iteratively performing a plurality times of training operations, uses the trained predictor model as an information assessment model; where a training operations including: predicting a usefulness label of the second sample comment information using the predictor model; using the usefulness label of the first sample comment information as a real label, using the usefulness label of the second sample comment information as a false label, discriminating authenticity of the usefulness label of the first sample comment information and authenticity of the usefulness label of the second sample comment information by using the discriminator model; iteratively updating, based on an error of the discrimination result of the discriminator model, a parameter of the discriminator model and a reward function, the reward function being associated with the parameter of the discriminator model and a parameter of the predictor model; determining a desired reward of the predictor model based on the reward function and the predictor model, and iteratively updating the parameter of the predictor model based on an error of the desired reward. The method and apparatus realizes training the assessment model based on massive comment information of unknown value, so that high-value comment information can be mined with low cost, and the accuracy of the generated information assessment model is improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
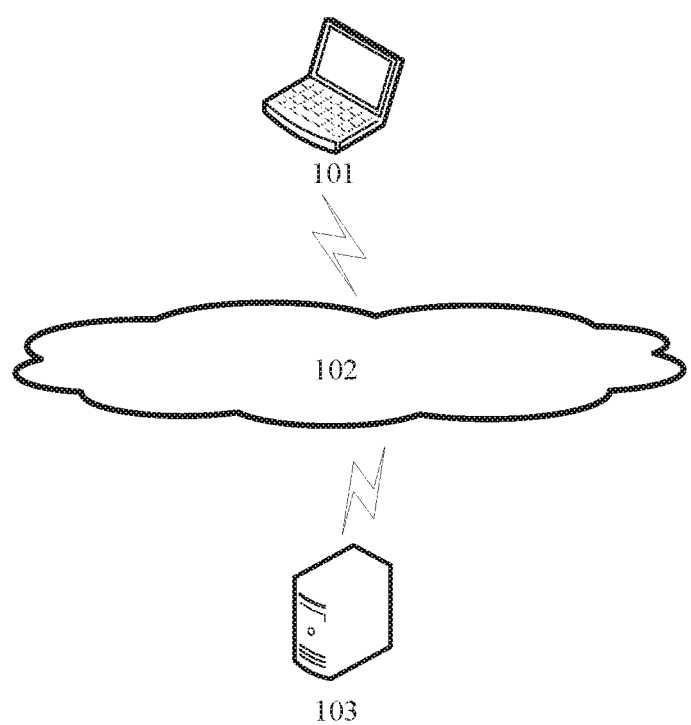
FIG. 1 is an architectural diagram of an example system in which embodiments of the present disclosure may be implemented.

FIG. 1 shows an example system architecture to which a method for generating an information assessment model or an apparatus for generating an information assessment model according to embodiments of the present disclosure may be applied.

As shown in FIG. 1, the system architecture 100 may include a client 101, a network 102, and a server 103. The network 102 serves as a medium providing a communication link between the client 101 and the server 103. The network may include various types of connections, such as wired or wireless communication links, or optical fiber cables.

The client 101 may be a client having a user interface, and a user may access the network through the client 101. The client 101 may be implemented as various electronic devices, including but not limited to a smart phone, a notebook computer, a desktop computer, a tablet computer, a smart watch, and the like. Alternatively, the client 101 may be implemented as various applications installed on the electronic devices, such as e-commerce shopping applications, knowledge sharing applications, social platform applications, audio and video playback applications.

The server 103 may provide network resource services. In practice, the server 103 may be implemented as a server that provides backend support for applications of the client 101, such as a server of an e-commerce platform, a server of knowledge sharing applications, a social platform server, an audio and video resource server.

The client 101 may establish a connection with the server 103 over the network 102. The user may issue a network resource acquisition request to the server 103 through the client 101. After receiving the request, the server 103 searches for a corresponding network resource, and feeds back the network resource to the client 101. The server 103 may also collect network resource access data of the client 101, for example, acquire a comment submitted by a user through the client 101, voting results about the usefulness of the comment, and the like, and then process the collected network resource access data, for example, train an information assessment model based on the collected comments, or give a usefulness assessment result of a comment. The server 103 may also feed the processing results of the network resource access data back to the client 101, for example, feed the usefulness assessment result of an existing comment back to the client 101.

It should be noted that the server 103 may be hardware or software. When the server 103 is hardware, the server 103 may be implemented as a distributed server cluster composed of multiple servers, or as a single server. When the server 103 is software, the server 103 may be implemented as a plurality of software programs or software modules (e.g., a plurality of software programs or software modules for providing distributed services), or as a single software program or software module. Specific limitations are not provided here.

It should be noted that the method for generating an information assessment model according to embodiments of the present disclosure may be performed by the server 103. Accordingly, the apparatus for generating an information assessment model may be provided in the server 103. The method for determining the usefulness of comment information according to some embodiments of the present disclosure may be performed by the client 101 or the server 103. Accordingly, the apparatus for determining the usefulness of comment information may be provided in the client 101 or the server 103.

It should be appreciated that the numbers of the client, the network, and the server in FIG. 1 are merely illustrative. Any number of clients, networks, and servers may be provided based on actual requirements.

Figure 2:
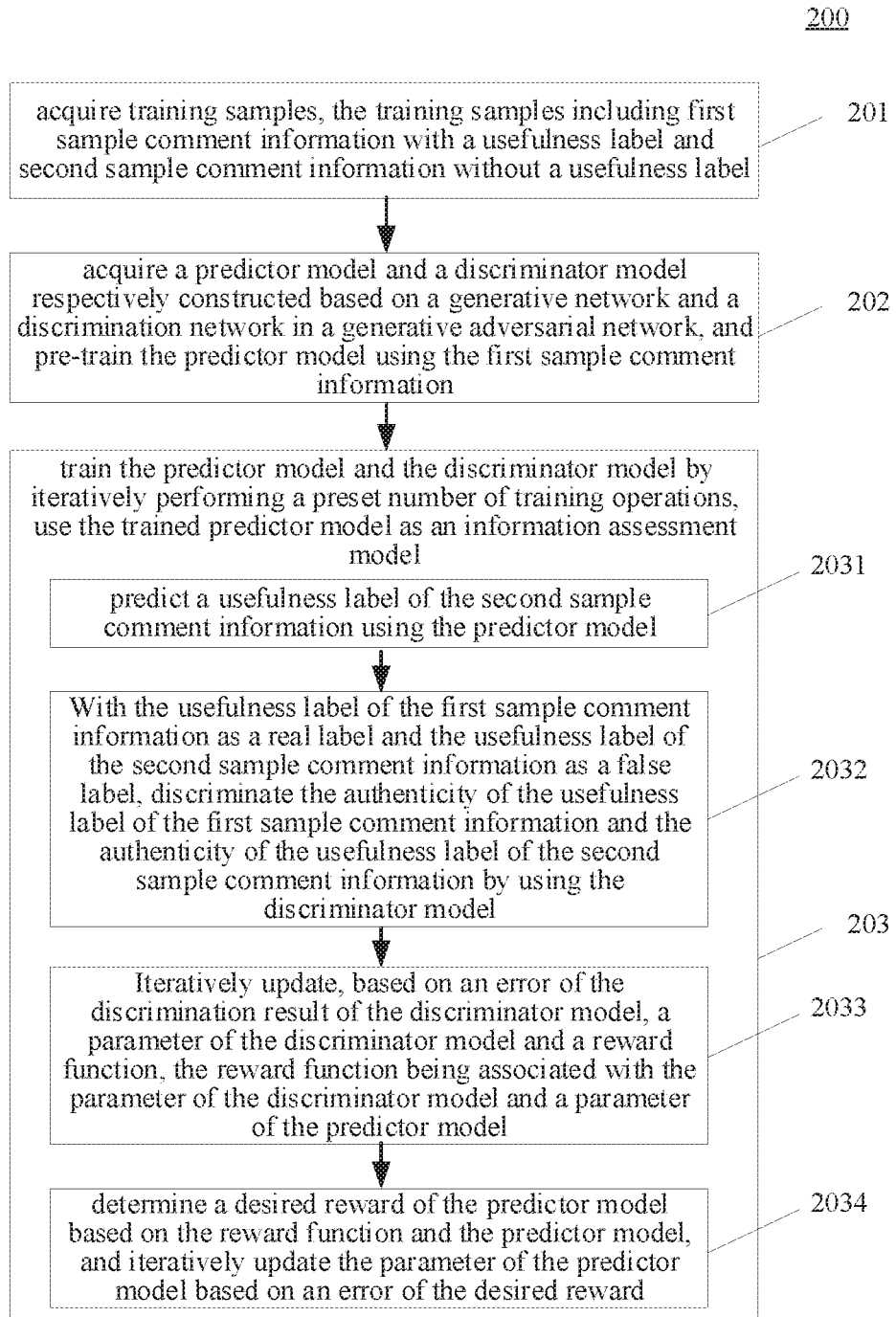
FIG. 2 is a flowchart of a method for generating an information assessment model according to an embodiment of the present disclosure.

Further referring to FIG. 2, a flow 200 of a method for generating an information assessment model according to an embodiment of the present disclosure is shown. The method for generating an information assessment model includes the following steps.

Step 201: acquiring training samples, the training samples including first sample comment information with a usefulness label and second sample comment information without a usefulness label.

In the present embodiment, the executing body of the method for generating an information assessment model may obtain an information assessment model through training by means of machine learning. Comment information targeting at a comment object in the Internet may be collected first as the training sample. Here, the comment object may be a product or content in the Internet, e.g., a published article or message, a published product, an audio and video resource, etc. The comment information is text information generated through a user evaluating the product or content in the Internet.

In practice, voting or scoring results on whether the comment information is useful may be collected by setting a voting or scoring button. When a comment is published, users viewing the comment may vote or score based on whether or how the comment is useful. The executing body may acquire the voting or scoring results of the users, and generate usefulness label based on the voting or scoring results of the users.

In the present embodiment, the pieces of comment information with a usefulness label in the collected training samples may be used as the first sample comment information. The voting or scoring results of some pieces of comment information about usefulness are not collected, such comment information does not have usefulness label and usefulness thereof is unknown, and the pieces of comment information without a usefulness label in the training samples may be used as the second sample comment information.

Step 202: acquiring a predictor model and a discriminator model respectively constructed based on a generative network and a discrimination network in a generative adversarial network, and pre-training the predictor model using the first sample comment information.

The predictor model may be constructed using the generative network in the generative adversarial network, and the discriminator model may be constructed using the adversarial network in the generative adversarial network. The predictor model is used to predict the usefulness label of a piece of comment information, and the discriminator model is used to discriminate the authenticity of the usefulness label. The predictor model and the discriminator model may employ a neural network architecture, for example, a deep neural network architecture.

The predictor model may be pre-trained using the first sample comment information acquired in step 201. The pre-training operation may be performed as follows: initializing a parameter of the predictor model, inputting the first sample comment information into the predictor model to predict a usefulness label, iteratively updating the parameter of the predictor model using a gradient descent method based on the prediction error of the predictor model for the usefulness label of the first sample comment information, and stopping the iterative update when the prediction error of the predictor model converges within a preset interval range or the number of iterations reaches a preset threshold, to complete the pre-training.

Step 203: training the predictor model and the discriminator model by iteratively performing a preset number of training operations, using the trained predictor model as an information assessment model.

The pre-trained predictor model and the discriminator model may be jointly trained using the first sample comment information and the second sample comment information. During the training, the parameter of the predictor model is iteratively adjusted to gradually improve the probability of that the prediction result of the predictor model for the usefulness label of the second sample comment information cannot be accurately discriminated by the discriminator as a false label, the parameter of the discriminator model is iteratively adjusted to gradually improve the probability of that the discriminator model accurately discriminates the authenticity of the usefulness labels of the first sample comment information and the second sample comment information. That is, a predictor model capable of predicting a usefulness label whose authenticity cannot be accurately discriminated by the discriminator is obtained through adversarial training of the predictor model and the discriminator model, and the obtained predictor model is used as a generated information assessment model.

Specifically, the joint training of the predictor model and the discriminator model may be implemented by iteratively performing the preset number of training operations. The training operation may include step 2031 to step 2034.

Step 2031: predicting a usefulness label of the second sample comment information using the predictor model.

In the first training operation, the usefulness label of the second sample comment information may be predicted using the predictor model obtained by the pre-training in step 202. In following training operations after the first training operation, the usefulness label of the second sample comment information may be predicted using the predictor model obtained after the previous training operation.

Step 2032: using the usefulness label of the first sample comment information as a real label, using the usefulness label of the second sample comment information as a false label, and discriminating the authenticity of the usefulness label of the first sample comment information and the usefulness label of the second sample comment information by using the discriminator model.

The usefulness label of the first sample comment information is acquired based on users' voting or scoring behaviors for the usefulness of the comment information, and therefore can be used as a real label. The usefulness label of the second sample comment information is predicted by the current predictor model, and therefore is a false label. The purpose of training the predictor model is to expect that the usefulness label predicted by the predictor model is difficult to be discriminated as a false label. The usefulness label of the first sample comment information and the usefulness label of the second sample comment information predicted by the current predictor model may be input into the current discriminator model, and the discriminator model may output discrimination results whether the usefulness labels are real labels.

In practice, the discriminator model may output a probability of that the usefulness label is discriminated as a real label or the usefulness label is discriminated as a false label. When the probability of that the usefulness label is discriminated as a real label or the usefulness label is discriminated as a false label output by the discriminator model is approximate 0.5, the probability of misjudgment of the discriminator model is high.

In an exemplary implementation, the discriminator model may be a binary model for discriminating whether the input usefulness label is a real label.

Alternatively, usefulness labels of an equal number of first sample comment information and second sample comment information may be selected in step 2032, for example, usefulness labels (real labels) of m pieces of first sample comment information and usefulness labels (false labels predicted by the predictor) of m pieces of second sample comment information are selected, and the authenticity of the selected usefulness labels is discriminated using the discriminator model, where m is a positive integer. In this way, it can be ensured that the discriminator model has an equal number of positive samples and negative samples, which helps to ensure the training effect of the discriminator and improve the accuracy of the discriminator.

Step 2033: iteratively updating, based on an error of the discrimination result of the discriminator model, the parameter of the discriminator model and a reward function associated with the parameter of the discriminator model and the parameter of the predictor model.

In the present embodiment, if the input usefulness label is a real label but the discriminator model discriminates the usefulness label as a false label, the discriminator model misjudges; or, if the input usefulness label is a false label but the discriminator model discriminates the usefulness label as a real label, the discriminator model misjudges. The overall judgment error rate of the discriminator model for the input usefulness labels may be counted as the error of the discriminator model. The parameter of the discriminator model are iteratively updated by back propagation, to make the error of the discriminator to be reduced.

Alternatively, the error of the discrimination result of the discriminator model may include a sum of an opposite number of a first cross entropy and an opposite number of a second cross entropy. The first cross entropy includes: a cross entropy between a first probability distribution that the usefulness label of the first sample comment information is a real label and a second probability distribution that the discriminator model discriminates the usefulness label of the first sample comment information as a real label. The second cross entropy includes: a cross entropy between a third probability distribution that the usefulness label of the second sample comment information is a real label and a fourth probability distribution that the discriminator model discriminates the usefulness label of the second sample comment information as a real label.

The discriminator model is represented by $J_\phi$ where $\phi$ represents a parameter of the discriminator model, and the first cross entropy $E_1$ and the second cross entropy $E_2$ may be respectively expressed as:

$$E_1 = E_{(x,y)\in D_L}[\log J_\phi(x, y)] \quad (1)$$

$$E_2 = E_{\substack{x\in D_U \\ \hat{y} \sim P_\theta}}[\log(1 - J_\phi(x, \hat{y}))] \quad (2)$$

Where, x represents an input of the predictor model, for example, the first sample comment information or the second sample comment information, $\hat{y}$ represents a prediction result of the predictor model for the usefulness label of the input x, y represents the usefulness label (real label) of the first sample comment information, $D_L$ represents a set formed by the first sample comment information, $D_U$ represents a set formed by the second sample comment information, and $P_\theta$ represents the predictor model, where $\theta$ represents a parameter of the predictor model. Then, the error of the discriminator model may be expressed as:

$$-E_{(x,y)\in D_L}[\log J_\phi(x, y)] - E_{\substack{x\in D_U \\ \hat{y} \sim P_\theta}}[\log(1 - J_\phi(x, \hat{y}))] \quad (3)$$

During training, the discriminator model may be optimized by minimizing the error of the discriminator represented by formula (3).

In the present embodiment, a reward function may be pre-set. The reward function characterizes a reward for the predicting ability of the predictor model, and may specifically characterize an extent to which the usefulness label generated by the predictor is approximately a real label. The reward function is related to the usefulness label $\hat{y}$ predicted by the predictor model and the discrimination performance of the discriminator model. The more approximate to a real label the usefulness label generated by the predictor model is, the more difficult for the discriminator model to accurately discriminate the authenticity of the usefulness label, and the larger the value of the reward function is. In practice, the reward function may be set based on the above relationship among the value of the reward function, the discriminator model and the predictor model.

In some alternative implementations, the reward function may be set as follows: when the input of the reward function is the second sample comment information, the output of the reward function is a result of authenticity discrimination by the discriminator model for the usefulness label of the second sample comment information. Here, the result of authenticity discrimination by the discriminator model for the usefulness label characterizes the probability of that the discriminator model discriminates the usefulness label as a real label. That is, for sample comment information without a real usefulness label, the value of the reward function is a probability of that the discriminator model determines the usefulness label predicted by the predictor model as a real label.

Further, alternatively, the reward function may also characterize a reward of the predictor model for the prediction result of the usefulness label of the first sample comment information. When the input of the reward function is the first sample comment information and the discriminator model discriminates the usefulness label of the first sample comment information as a real label, the value of the reward function is 1; when the input of the reward function is the first sample comment information and the discriminator model discriminates the usefulness label of the first sample comment information as a false label, the value of the reward function is 0. That is, the reward function $V(\hat{y}, x)$ may be set according to formula (4):

$$V(\hat{y}, x) = \begin{cases} 1, & \text{if } x \in D_L \ \& \ \hat{y} = y \\ 0, & \text{if } x \in D_L \ \& \ \hat{y} \neq y \\ J_\phi(x, \hat{y}), & \text{if } x \in D_U \end{cases} \quad (4)$$

Where, x represents an input of the predictor model, such as the first sample comment information or the second sample comment information, $\hat{y}$ represents a prediction result of the predictor model for the usefulness label of the input x, y represents the usefulness label of the first sample comment information, $D_L$ represents a set formed by the first sample comment information, $D_U$ represents a set formed by the second sample comment information, $J_\phi$ represents the discriminator model, and $\phi$ represents a parameter of the discriminator model.

The reward function $V(\hat{y}, x)$ may be updated based on the parameter $\phi$ of the discriminator model $J_\phi$.

Step 2034: determining a desired reward of the predictor model based on the reward function and the predictor model, and iteratively updating the parameter of the predictor model based on an error of the desired reward.

The desired reward may characterize a desired value of the reward brought by the predictor model. Here, when the authenticity of the usefulness label output by the predictor model is misjudged by the discriminator model, the predictor model obtains a positive reward (for example, obtains a reward value 1); on the contrary, when the authenticity of the usefulness label output by the predictor model is correctly judged by the discriminator model, the predictor model obtains a negative reward (for example, obtains a reward value 0). The desired reward may be related to the reward function and the predictor model. The greater the value of the reward function is, the greater the value of the desired reward is.

In some alternative implementations, the reward function may be set as follows: when the input of the reward function is the second sample comment information, the output is a result of authenticity discrimination by the discriminator model for the usefulness label of the second sample comment information, and the reward function may be multiplied by the prediction result of the predictor model to calculate the desired reward. Specifically, the predictor model may be a probability distribution model, a parameter of the predictor model is represented by $\theta$, the predictor model characterizes the probability distribution $P_\theta(\hat{y}|x)$ of the usefulness label $\hat{y}$ when the input x is given, and the desired reward of the predictor model is represented by $R(\theta)$:

$$R(\theta) = E[R | X, \theta] = \sum_{\hat{y} \in Y} P_\theta(\hat{y} | x) V(\hat{y}, x) \quad (5)$$

Where, R represents a reward value, X represents a training sample, Y represents an interval formed by feasible usefulness labels, and $V(\hat{y}, x)$ is a reward function.

After the reward function $V(\hat{y}, x)$ is updated in step 2033, the desired reward $R(\theta)$ may be calculated according to formula (5), then whether the desired reward reaches a preset reward value condition is judged. And if the preset reward value condition is not reached, the parameter of the predictor model is iteratively updated. Here, the preset reward value condition may include that the error of the desired reward $R(\theta)$ is smaller than a preset reward error threshold. The error of the desired reward $R(\theta)$ may be calculated after the desired reward $R(\theta)$ is calculated according to formula (5). The error of the desired reward $R(\theta)$ may be calculated based on the difference between the desired reward and a preset maximum reward value.

Since a positive reward is fed back to the predictor model in response to a misjudgment of the predictor model, and a negative reward is fed back to the predictor model in response to a correct judgment of the predictor model, accordingly, the greater the reward value is, the greater the probability of that the predictor model misjudges is. Whether the iterative update of the model parameter is stopped can be determined by judging whether the desired reward $R(\theta)$ reaches the maximum value. If the desired reward $R(\theta)$ does not reach the maximum value, the parameter $\theta$ of the predictor model $P_\theta(\hat{y}|x)$ may be iteratively updated based on the error of the desired reward $R(\theta)$.

The gradient of the desired reward $R(\theta)$ may be calculated according to formula (6):

$$\nabla R(\theta) = \sum_{\hat{y} \in Y} \nabla_\theta P_\theta(\hat{y}|x) V(\hat{y}, x) \quad (6)$$

By using the predictor model $P_\theta(\hat{y}|x)$ is as a strategy model, and using a likelihood ratio algorithm of a REINFORCE algorithm in a strategy gradient algorithm, formula (6) is further written as:

$$\nabla R(\theta) = \sum_{\hat{y} \in Y} P_\theta(\hat{y}|x) \frac{\nabla_\theta P_\theta(\hat{y}|x)}{P_\theta(\hat{y}|x)} V(\hat{y}, x) \quad (7)$$

$$= \sum_{\hat{y} \in Y} P_\theta(\hat{y}|x) \nabla_\theta \log P_\theta(\hat{y}|x) V(\hat{y}, x)$$

$$= E_{P_\theta(\hat{y}|x)}[\nabla_\theta \log P_\theta(\hat{y}|x) V(\hat{y}, x)]$$

Formula (7) is an unbiased estimate of formula (6). When training using m pieces of first sample comment information with usefulness labels and m pieces of second sample comment information without usefulness labels, the gradient of the desired reward $R(\theta)$ may be calculated approximately as:

$$\nabla R(\theta) \approx \frac{1}{2m} \sum_{i=1}^{m} [\nabla_\theta \log P_\theta(\hat{y}|x) V(\hat{y}, x)] \quad (8)$$

The parameter $\theta$ of the predictor model $P_\theta(\hat{y}|x)$ may be updated according to formula (9):

$$\theta^+ = \theta^- + \alpha \nabla_\theta R(\theta^-) \quad (9)$$

Where, $\alpha$ represents a learning rate, that is, a step parameter of gradient descent, and $\theta+$ and $\theta-$ represent the parameter of the updated predictor model and the parameter of the current predictor model, respectively.

After the parameter of the discriminator model and the parameter of the predictor model are respectively updated in step 2033 and step 2034, the current training operation may be ended. The process returns to step 2031 to perform a next training operation based on the updated discriminator model and predictor model. In this way, the parameter of the discriminator model and the parameter of the predictor model are continuously optimized by iteratively performing a plurality of training operations. When the error of the desired reward of the predictor model converges within the preset error range, or when the desired reward of the predictor model reaches the preset maximum value, or when a preset number of training operations is performed, the training operations may be stopped, to obtain a trained predictor model and discriminator model.

In the method for generating an information assessment model according to the above embodiments of the present disclosure, training samples are acquired, the training sample including first sample comment information with a usefulness label and second sample comment information without a usefulness label; then, a predictor model and a discriminator model respectively constructed based on a generation network and a discrimination network in a generative adversarial network are acquired, and the predictor model is pre-trained using the first sample comment information, the predictor model being used to predict a usefulness label of a piece of comment information, the discriminator model being used to discriminate the authenticity of a usefulness label; and the predictor model and the discriminator model are trained by iteratively performing a plurality times of training operations, and the trained predictor model is used as an information assessment model, where the training operation includes: predicting a usefulness label of the second sample comment information using the predictor model, using the usefulness label of the first sample comment information as a real label, using the usefulness label of the second sample comment information as a false label, discriminating the authenticity of the usefulness label of the first sample comment information and the authenticity of the usefulness label of the second sample comment information by using the discriminator model, iteratively updating, based on the error of the discrimination result of the discriminator model, a parameter of the discriminator model and a reward function associated with the parameter of the discriminator model and a parameter of the predictor model, determining a desired reward of the predictor model based on the reward function and the predictor model, and iteratively updating the parameter of the predictor model based on an error of the desired reward. Therefore, the assessment model is trained based on massive comment information of unknown value, high-value comment information can be mined with low cost, and the accuracy of the generated information assessment model is improved.

Figure 3:
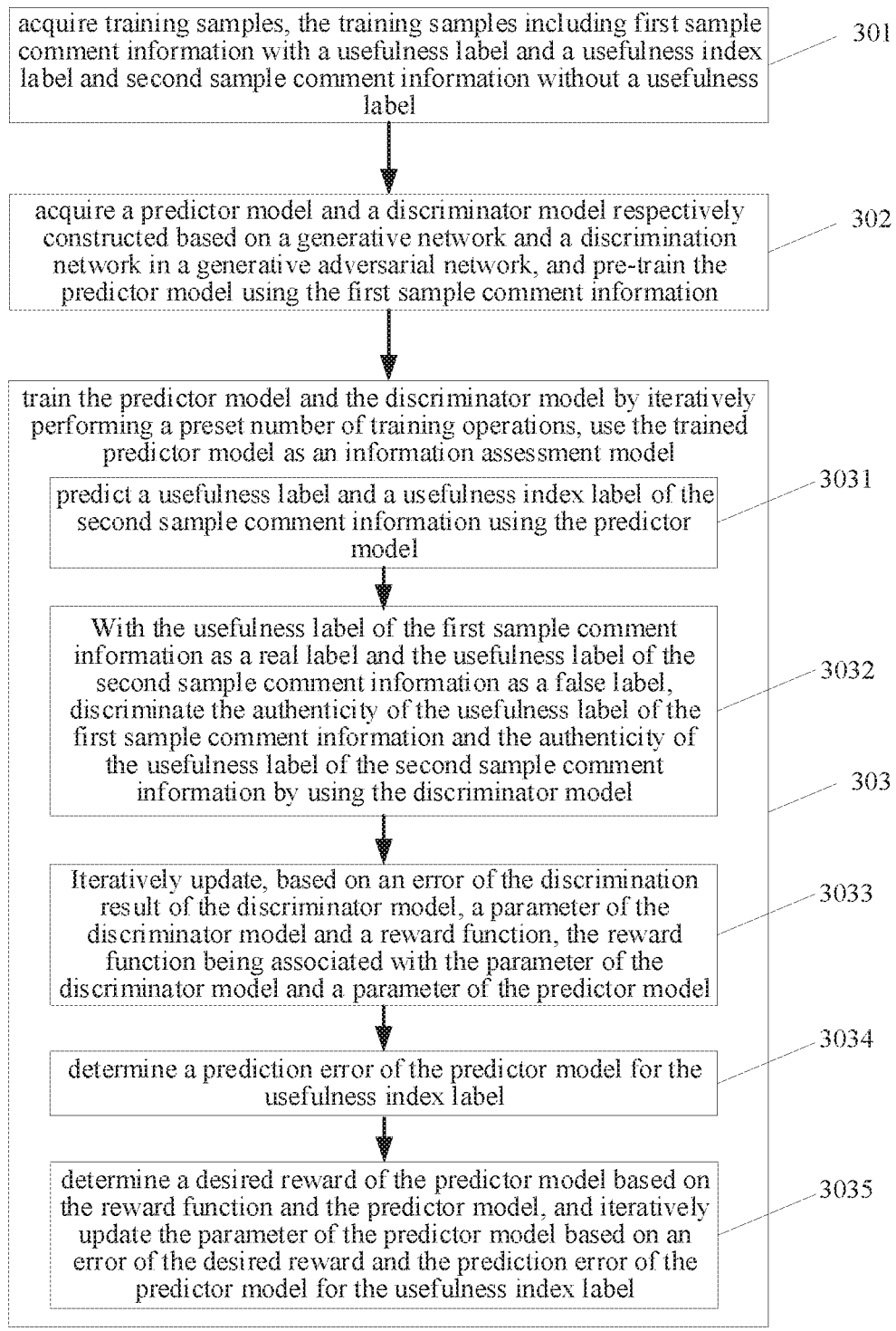
FIG. 3 is a flowchart of the method for generating an information assessment model according to another embodiment of the present disclosure.

Further referring to FIG. 3, a flowchart of the method for generating an information assessment model according to another embodiment of the present disclosure is shown. As shown in FIG. 3, the flow 300 of the method for generating an information assessment model includes the following steps.

Step 301: acquiring training samples, the training samples including first sample comment information with a usefulness label and a usefulness index label and second sample comment information without a usefulness label.

The executing body of the method for generating an information assessment model may acquire the training sample by the same way as described in step 201.

In the present embodiment, the first sample comment information also has a usefulness index label, which is used to characterize a degree of usefulness, for example, a score of usefulness.

In practice, results of assessment by users for the degrees of usefulness of comment information may be collected, for example, a scoring option for the degree of usefulness is set for published comment information, users' scoring for the degree of usefulness of the comment information are acquired, and the usefulness index label of the comment information is determined based on the statistical result of the scores.

The comment information with a usefulness label and a usefulness index label acquired from the collection of user feedback data may be used as the first sample comment information, and the comment information whose usefulness and usefulness index feedback data are collected may be used as the second sample comment information, to construct the training samples.

Step 302: acquiring a predictor model and a discriminator model respectively constructed based on a generative network and a discrimination network in a generative adversarial network, and pre-training the predictor model using the first sample comment information.

The predictor model may be constructed using the generative network in the generative adversarial network, and the discriminator model may be constructed using the adversarial network in the generative adversarial network. In the present embodiment, the predictor model is used to predict a usefulness label and a usefulness index label of a piece of comment information, and the discriminator model is used to determine the authenticity of a usefulness label.

The predictor model may be pre-trained using the first sample comment information. During pre-training, a parameter of the predictor model may be initialized, the first sample comment information is input into the predictor model to predict a usefulness label and a usefulness index label, the parameter of the predictor model is iteratively updated using a gradient descent method based on the prediction error of the predictor model for the usefulness label of the first sample comment information and the prediction error of the predictor model for the usefulness index label of the first sample comment information, the iterative update is stopped until the prediction errors of the predictor model converge within a preset interval range or the number of iterations reaches a preset threshold, to complete the pre-training. Here, the parameter of the predictor model may be iteratively updated based on a joint prediction error of the predictor model for the usefulness label and usefulness index label of the first sample comment information. Alternatively, the parameter of the predictor model is updated alternately based on the prediction error of the predictor model for the usefulness label of the first sample comment information and the prediction error of the predictor model for the usefulness index label of the first sample comment information during iteration. For example, the parameter of the predictor model is updated based on the prediction error of the predictor model for the usefulness label of the first sample comment information in an odd number of the iteration, and the parameter of the predictor model is updated based on the prediction error of the predictor model for the usefulness index label of the first sample comment information in an even number of iteration.

Step 303: training the predictor model and the discriminator model by iteratively performing a preset number of training operations, using the trained predictor model as an information assessment model.

In the present embodiment, the training operation may include step 3031 to step 3035.

Step 3031: predicting a usefulness label and a usefulness index label of the second sample comment information using the predictor model.

When the first training operation is performed, the usefulness label and usefulness index label of the second sample comment information may be predicted using the predictor model obtained by the pre-training in step 302. In the training operations after the first training operation, the usefulness label and usefulness index label of the second sample comment information may be predicted using the predictor model obtained after the previous training operation.

Step 3032: using the usefulness label of the first sample comment information as a real label, using the usefulness label of the second sample comment information as a false label, and discriminating authenticity of the usefulness label of the first sample comment information and authenticity of the usefulness label of the second sample comment information by using the discriminator model.

Step 3033: iteratively updating, based on an error of the discrimination result of the discriminator model, a parameter of the discriminator model and a reward function, the reward function being associated with the parameter of the discriminator model and a parameter of the predictor model.

Steps 3032 and 3033 in the present embodiment are respectively identical to steps 2032 and 2033 of the foregoing embodiment, and specific implementations of step 3032 and step 3033 may be referred to the description of step 2032 and step 2033 in the foregoing embodiment, respectively. Details are not described herein again.

Step 3034: determining a prediction error of the predictor model for the usefulness index label.

In the present embodiment, the prediction error of the predictor model for the usefulness index label may characterize the difference between the real usefulness index label of the input comment information and the usefulness index label predicted by the predictor model.

In some alternative implementations, the real usefulness degree of the second sample comment information is unknown, and the usefulness index label of the first sample comment information may be converted into a usefulness index label of the second sample comment information based on the similarity between the second sample comment information and the first sample comment information. For example, when the similarity between the second sample comment information and the first sample comment information is not smaller than a preset similarity threshold (for example, 90%), the usefulness index of the second sample comment information may be identical to the usefulness index of the first sample comment information.

Alternatively, the usefulness index label of the second sample comment information may be determined based on an amount of text information of the second sample comment information. For example, the degrees of the importance of respective words in the second sample comment information may be determined by TF-IDF (term frequency-inverse document frequency), an information entropy of the whole second sample comment information is then calculated based on the degrees of the importance of the respective words, and the amount of text information of the second sample comment information is determined and converted into the usefulness index label of the second sample comment information.

After the usefulness index label of the second sample comment information is determined, the prediction error Ls of the predictor model for the usefulness index label may be calculated, where the prediction error Ls is also related to the parameter θ of the predictor model.

In other alternative implementations, the second sample comment information may have a usefulness index label, i.e., the training samples may include second sample comment information with a usefulness index label. Then, the prediction error Ls of the predictor model for the usefulness index label may be calculated based on the difference between the usefulness index label predicted by the predictor model and the usefulness index label of the second sample comment information.

Step 3035: determining a desired reward of the predictor model based on the reward function and the predictor model, and iteratively updating the parameter of the predictor model based on an error of the desired reward and the prediction error of the predictor model for the usefulness index label.

The desired reward of the predictor model and the error of the desired reward may also be determined by the way described in step 2024 of the foregoing embodiments, for example, the desired reward may be determined based on formula (5), and the gradient of the desired reward is calculated based on formulas (6) (7) (8).

In the present embodiment, the gradient of the prediction error of the predictor model for the usefulness index label may also be calculated: $\nabla_\theta Ls$.

During updating the parameter of the predictor model, the parameter of the predictor model may be iteratively updated alternately based on the error of the desired reward and the prediction error of the predictor model for the usefulness index label. Specifically, in a current training operation, the parameter of the predictor model is updated based on the error of the desired reward, that is, the parameter of the predictor model may be updated using formula (9) above; and in a next training operation, the parameter of the predictor model is updated based on the prediction error for the usefulness index label, that is, the parameter may be updated using formula (10) below:

$$\theta^+ = \theta^- - \alpha \nabla_\theta Ls(\theta^-) \quad (10)$$

Where, α represents a learning rate, that is, a step parameter of gradient descent, and θ+ and θ− represent the updated parameter of the predictor model and the parameter of the current predictor model, respectively.

The parameter of the predictor model may be updated based on formula (9) in an odd number of training, and updated based on formula (10) in an even number of training. Alternatively, the parameter of the predictor model may be updated based on formula (10) in an odd number of training, and updated based on formula (9) in an even number of training.

In the method for generating an information assessment model according to the present embodiment, a predictor model is pre-trained based on a sample with a usefulness label and a usefulness index label to have a preliminary usefulness and usefulness index prediction ability, and a parameter of the predictor model is iteratively updated during training based on the prediction errors of the predictor model for the usefulness label and the usefulness index label alternately, so that a predictor model capable of simultaneously assessing the usefulness and usefulness index of comment information can be obtained by training, and the prediction ability and prediction efficiency of the predictor model are improved.

Figure 4:
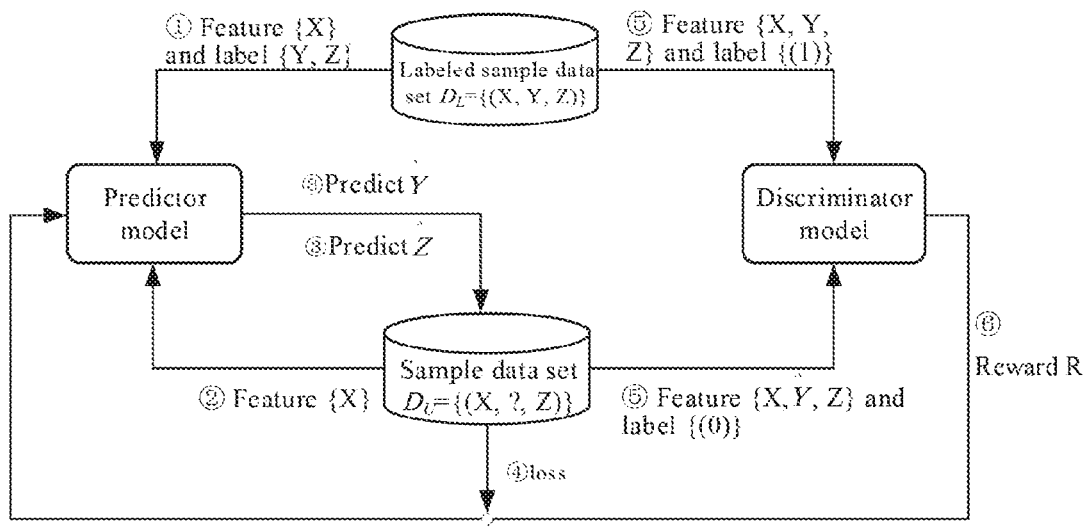
FIG. 4 is a schematic diagram of a principle architecture of a specific implementation of the method for generating an information assessment model.

Referring to FIG. 4, a schematic diagram of a principle architecture of a specific implementation of the method for generating an information assessment model as shown in FIG. 3 is shown.

As shown in FIG. 4, a predictor model is trained based on a sample data set $D_L$ with a usefulness label and a usefulness index label and a sample data set $D_U$ without a usefulness label but with a usefulness index label, where the sample data set $D_L$ includes a sample comment information set {(X, Y, Z)}, X represents sample comment information, Y represents the usefulness label, and Z represents the usefulness index label. The sample data set $D_U$ includes a sample comment information set {(X, ?, Z)}, and "?" represents an unknown usefulness label. The predictor model predicts a usefulness label $\hat{Y}$ and a usefulness index label $\hat{Z}$ based on the feature {X} and the label {Y, Z} of the sample data set $D_L$, and the feature {X} of the sample data set $D_U$. The authenticity of the label of the sample data set $D_L$ is set to 1, the authenticity of the label of the sample data set $D_U$ is set to 0, then the labels are discriminated using the discriminator model, a reward R is fed back to the predictor model according to the results of discrimination by the discriminator model for the authenticity of the labels. At the same time, the parameter of the predictor model is iteratively adjusted based on the prediction error loss of the predictor model for the usefulness index label of the sample data set $D_U$.

In some alternative implementations of the embodiment described above in combination with FIG. 2 and FIG. 3, the flow of the method for generating an information assessment model may further include a step of acquiring comment object information corresponding to the training samples. The comment object information refers to information about a comment object to which the comment information is directed. The comment object may be a content in the Internet, such as a product, an article, or a post. The comment object information may include text description information of the comment object, such as a title of the comment object.

Then, the predictor model may include an information preprocessing network and a classification network. The information preprocessing network is used to convert a training sample and the comment object information corresponding thereto into a mathematical representation, and the classification network predicts usefulness label of the training sample based on the mathematical representation of the training sample. Alternatively, the classification network may also predict the usefulness index label of the training sample based on the mathematical representation of the training sample.

The training sample and the comment object information corresponding to the training sample are text information, and the text information may be converted into a corresponding mathematical representation. For example, the first sample comment information/second sample comment information and the comment object information corresponding thereto may be converted into vectors respectively, and then the vectors may be integrated together to form the codes of the sample comment information including the comment object information. Thus, the formed mathematical representation includes not only the sample comment information but also the comment object information.

Alternatively, the information preprocessing network includes a first bi-directional long short-term memory network and a second bi-directional long short-term memory network; the first bi-directional long short-term memory network converts the training sample into a first vector representation, and the second bi-directional long short-term memory network converts the comment object information corresponding to the training sample into a second vector representation.

Figure 5:
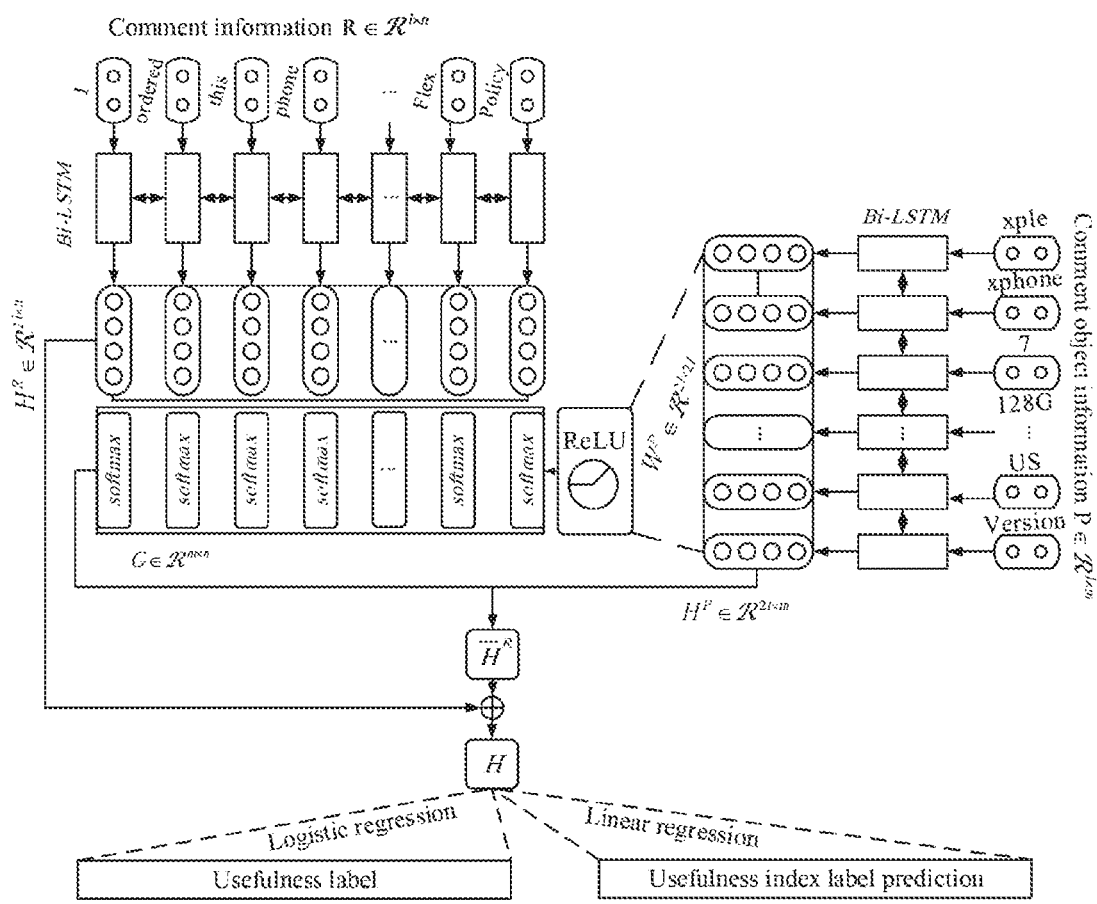
FIG. 5 is a schematic structural diagram of a predictor model.

Referring to FIG. 5, a schematic structural diagram of a predictor model is shown. A training sample (the first sample comment information or the second sample comment information) may be first segmented. Assuming that the comment information R as the training sample contains n words, each word is converted into a word vector by looking up in a vector table, then the training sample is $R \in R^{l \times n}$, where l represents the vector length and R represents the real number field; similarly, the comment object information P including m words is $P \in R^{l \times m}$. In FIG. 5, taking a word sequence of "I ordered this phone . . . Flex Policy" obtained by segmenting the comment information and "xple xphone 7 128G . . . US Version" obtained by segmenting the corresponding comment object information as an example, the training sample R and the comment object information P may be respectively coded into $H^R$ and $H^P$ using Bi-LSTM (Bi-directional long short-term memory), where $H^R \in R^{2l \times n}$, $H^P \in R^{2l \times m}$.

In order to enable the training sample to encompass the comment object information more comprehensively, the first vector representation and the second vector representation of the corresponding comment object information may be integrated into a mathematical representation corresponding to the training sample by a method based on an attention mechanism. Specifically, Q is defined as:

$$Q = ReLU(W^P H^P + b^P \otimes e_p)^T H^R \quad (10)$$

Where, $W^P \in R^{2l \times 2l}$ is a weight matrix, $b^P \in R^{2l}$ is an offset vector, ReLU is an activation function, $b^P \otimes e_p$ represents to copy the offset vector $b^P$ m times to generate a matrix of 2l×m, and $Q \in R^{m \times n}$ is a word-level sparse matrix that contains matching information between the comment object information and the training sample. A softmax function is applied to each column of Q to obtain an attention matrix G: G=softmax (Q). Where, G is a matrix of m rows and n columns, the $i^{th}$ column of the matrix G represents weights or degrees of importance of respective words of the comment object information to the $i^{th}$ word in the comment information as the training sample, and the $j^{th}$ row of the matrix G represents weights or degrees of importance of respective words in the comment information as the training sample to the $j^{th}$ word in the comment object information.

The attention matrix G is applied to the $H^P$ to obtain a mathematical representation $\overline{H}^R$ of the comment information including the comment object information:

$$\overline{H}^R = H^P G$$

Thereafter, $\overline{H}^R$ and $H^R$ may be combined together to obtain a matrix $H \in R^{2l \times n}$ to serve as a mathematical representation of the training sample.

As shown in FIG. 5, the predictor model further includes a classification network. The classification network may include a logistic regression layer for performing usefulness label prediction and a linear regression layer for performing usefulness index label prediction.

Figure 6:
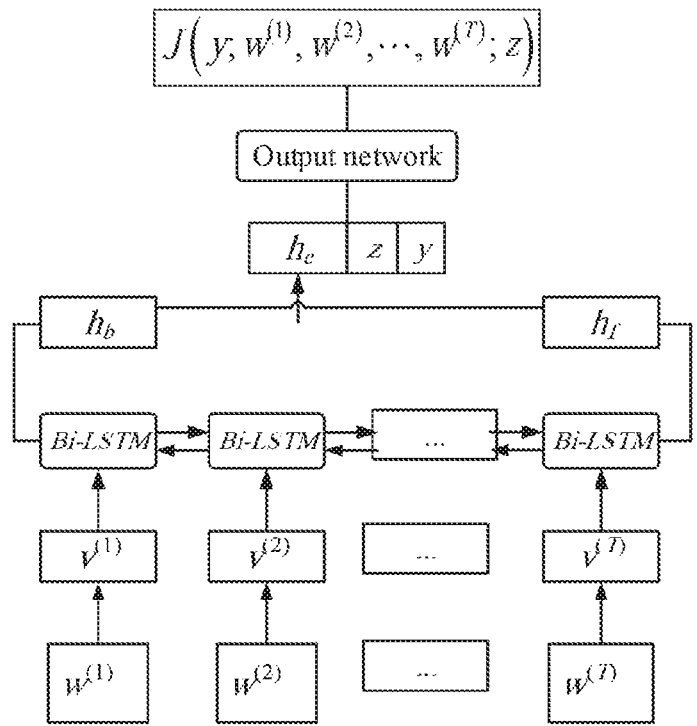
FIG. 6 is a schematic structural diagram of a discriminator model.

FIG. 6 shows an example structural diagram of a discriminator model. Bi-LSTM may be used as the discriminator model.

Assuming that a piece of comment information as a training sample contains T words. The comment information is expressed as $x = \{w^{(1)}, w^{(2)}, \ldots, w^{(T)} | w^{(t)} \in \{0,1\}^k\}$, where $w^{(t)}$ is a one-hot vector of each word, and k is a vocabulary size. The corresponding usefulness label is represented by a one-hot vector $y \in \{0,1\}^c$, and the usefulness index label is represented by a one-hot vector $z \in \{0,1\}^d$, where c is the number of categories of usefulness labels (for example, 2), and d is the number of usefulness index labels. An embedded matrix E may be used to convert the one-hot vector of each word into a p-dimensional distribution vector $\{v^{(1)}, v^{(2)}, \ldots, v^{(T)}\}$. A piece of comment information is given, through the processing by Bi-LSTM, the final hidden state of the forward LSTM is $h_f$, and the final hidden state of the reverse LSTM is $h_b$. The $h_f$ and the $h_b$ are spliced into $h_c$, and then the $h_b$ is spliced with the usefulness label vector y and the usefulness index label vector z and input to an output network to obtain a discrimination result. The goal of the discriminator model is to assess a probability of that (y; $w^{(1)}, w^{(2)}, \ldots, w^{(T)}$; z) is from the sample data set $D_L$ with labels. Where the output network may be a fully connected network, and the output o of the output network is represented by formula (12):

$$o = [h_c, z, y] g W_o + b_o \quad (12)$$

Where, $W_o$ is a weight vector of the output network, and $b_o$ is an offset vector of the output network.

The discriminator model $J_\phi$ may be trained, by training the cross entropy represented by minimizing the formula (3) above with the real label as a positive sample and the false label as a negative sample.

Figure 7:
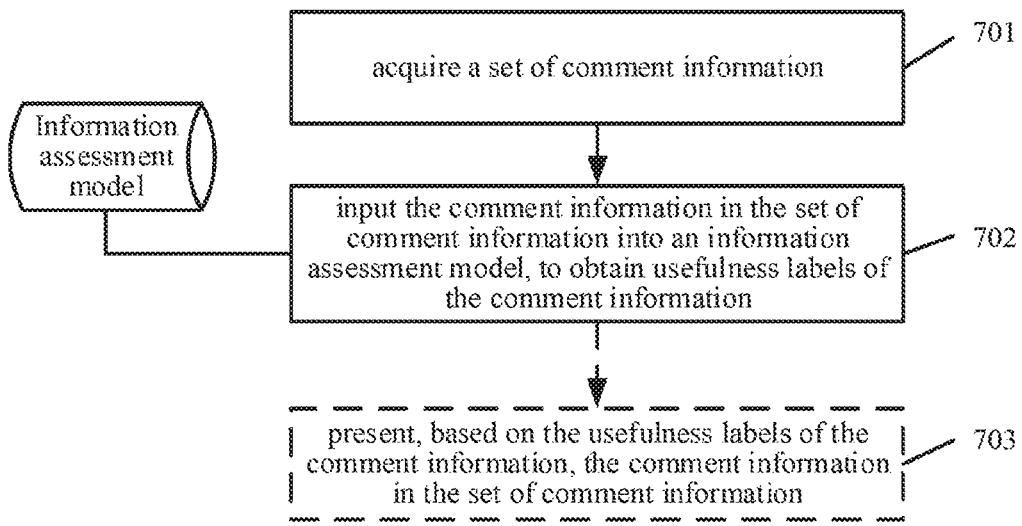
FIG. 7 is a flowchart of a method for determining usefulness of comment information according to an embodiment of the present disclosure.

Further referring to FIG. 7, a flowchart of a method for determining the usefulness of comment information according to an embodiment of the present disclosure is shown. As shown in FIG. 7, the flow of the method for determining the usefulness of comment information may include:

Step 701: acquiring a set of comment information.

Step 702: inputting the comment information in the set of comment information into an information assessment model to obtain usefulness labels of the comment information, where the information assessment model is generated by the method for generating an information assessment model according to the above embodiments of the present disclosure.

In the present embodiment, the set of comment information may be collected from a network and has uncertain usefulness. The comment information in the set of comment information may be preprocessed using the information preprocessing network in the predictor model shown in FIG. 5, and classified using the classification network in the predictor model, to obtain usefulness labels and/or usefulness index labels corresponding to the comment information.

The method for determining the usefulness of comment information according to the above embodiment of the present disclosure assesses the usefulness of comment information using a trained information assessment model to obtain a relatively accurate assessment result, which helps to filter out useful comment information as references for decision making.

In some embodiments, the method for determining the usefulness of comment information may further include:

Step 703: presenting, based on the usefulness labels of the comment information, the comment information in the set of comment information.

The comment information with a usefulness label "useful" may be preferentially displayed, or a "useful" or "useless" label is displayed in each piece of comment information according to the configuration of usefulness labels, or the comment information with a usefulness label "useless" may be filtered (not displayed), etc.

By presenting the comment information based on the usefulness labels, whether the comment information is useful can be clearly prompted or displayed, which effectively helps the user browsing the comment information to filter useful comment information.

Figure 8:
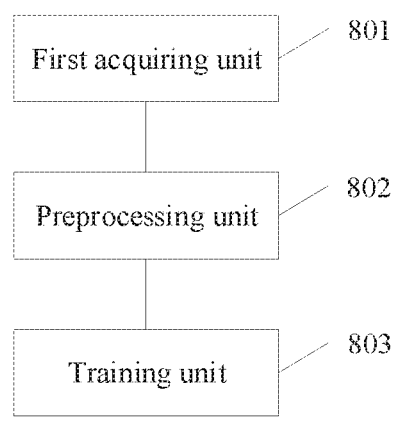
FIG. 8 is a schematic structural diagram of an apparatus for generating an information assessment model according to an embodiment of the present disclosure.

Further, referring to FIG. 8, as an implementation of the method shown in the above figures, the present disclosure provides an embodiment of an apparatus for generating an information assessment model. The embodiment of the apparatus corresponds to the embodiments of the methods shown in FIG. 2 and FIG. 3, and the apparatus may be applied to various electronic devices.

As shown in FIG. 8, the apparatus 800 for generating an information assessment model in the present embodiment includes: a first acquiring unit 801, a preprocessing unit 802, and a training unit 803. The first acquiring unit 801 is configured to acquire training samples, the training samples including first sample comment information with a usefulness label and second sample comment information without a usefulness label; the preprocessing unit 802 is configured to acquire a predictor model and a discriminator model respectively constructed based on a generation network and a discrimination network in a generative adversarial network, and pre-train the predictor model using the first sample comment information, the predictor model being used to predict a usefulness label of a piece of comment information, the discriminator model being used to discriminate authenticity of a usefulness label; the training unit 803 is configured to train the predictor model and the discriminator model by iteratively performing a preset number of training operations, using the trained predictor model as an information assessment model; a training operation includes: predicting a usefulness label of the second sample comment information using the predictor model; using the usefulness label of the first sample comment information as a real label, using the usefulness label of the second sample comment information as a false label, discriminating authenticity of the usefulness label of the first sample comment information and authenticity of the usefulness label of the second sample comment information by using the discriminator model; iteratively updating, based on an error of the discrimination result of the discriminator model, a parameter of the discriminator model and a reward function, the reward function being associated with the parameter of the discriminator model and a parameter of the predictor model; determining a desired reward of the predictor model based on the reward function and the predictor model, and iteratively updating the parameter of the predictor model based on an error of the desired reward.

In some embodiments, the training unit 803 is configured to discriminate authenticity of the usefulness label of the first sample comment information and authenticity of the usefulness label of the second sample comment information by using the discriminator model in the training operation as follows: selecting usefulness labels of an equal number of first sample comment information and second sample comment information, and discriminating authenticity of the selected usefulness labels by using the discriminator model.

In some embodiments, the error of the discrimination result of the discriminator model includes a sum of an opposite number of a first cross entropy and an opposite number of a second cross entropy; the first cross entropy includes: a cross entropy between a first probability distribution of that the usefulness label of the first sample comment information is a real label and a second probability distribution of that the discriminator model discriminates the usefulness label of the first sample comment information as a real label; the second cross entropy includes: a cross entropy between a third probability distribution of that the usefulness label of the second sample comment information predicted by the predictor model is a real label and a fourth probability distribution of that the discriminator model discriminates the usefulness label of the second sample comment information as a real label.

In some embodiments, when an input of the reward function is the second sample comment information, an output is a result of authenticity discrimination by the discriminator model for the usefulness label of the second sample comment information; and the training unit 803 is configured to determine the desired reward of the predictor model in the training operation, and iteratively update the parameter of the predictor model based on an error of the desired reward as follows: multiplying the reward function by a prediction result of the predictor model to calculate the desired reward, and iteratively updating, in response to determining that the desired reward does not reach a preset reward value condition, the parameter of the predictor model.

In some embodiments, when the input of the reward function is the first sample comment information and the discriminator model discriminates the usefulness label of the first sample comment information as a real label, the value of the reward function is 1; when the input of the reward function is the first sample comment information and the discriminator model discriminates the usefulness label of the first sample comment information as a false label, the value of the reward function is 0.

In some embodiments, the first sample comment information also has a usefulness index label, the usefulness index label is used to characterize a degree of usefulness, and the predictor model is also used to predict a usefulness index label of a piece of comment information; the training operation performed by the training unit 803 also includes: predicting a usefulness index label of the second sample comment information using the predictor model, and determining a prediction error of the predictor model for the usefulness index label; and the training unit 803 is configured to iteratively update the parameter of the predictor model in the training operation as follows: iteratively updating the parameter of the predictor model based on the error of the desired reward and the prediction error of the predictor model for the usefulness index label alternately.

In some embodiments, the first acquiring unit is also configured to acquire comment object information corresponding to the training samples; the predictor model includes an information preprocessing network and a classification network; the information preprocessing network is used to convert a training sample and comment object information corresponding thereto into a mathematical representation, and the classification network predicts usefulness label of the training sample based on the mathematical representation.

In some embodiments, the information preprocessing network includes a first bi-directional long short-term memory network and a second bi-directional long short-term memory network; the first bi-directional long short-term memory network converts the training sample into a first vector representation, and the second bi-directional long short-term memory network converts the comment object information corresponding to the training sample into a second vector representation; the information preprocessing network integrates, based on an attention mechanism, the first vector representation of the training sample and the second vector representation of the comment object information corresponding thereto into the mathematical representation corresponding to the training sample.

It should be understood that the units described in the apparatus 800 may correspond to the respective steps in the methods described with reference to FIG. 2 and FIG. 3. Therefore, the operations and characteristics described above for the methods are also applicable to the apparatus 800 and the units included therein, and details are not described herein again.

The apparatus 800 for generating an information assessment model according to the above embodiment of the present disclosure can train an assessment model based on massive comment information of unknown value, mine high-value comment information with low cost, and improve the accuracy of the generated information assessment model.

Figure 9:
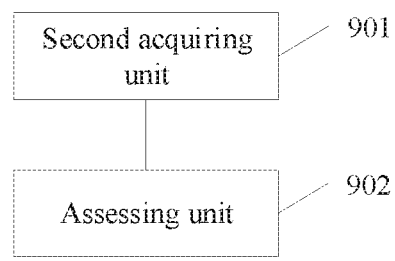
FIG. 9 is a schematic structural diagram of an apparatus for determining usefulness of comment information according to an embodiment of the present disclosure.

Further, referring to FIG. 9, as an implementation of the method shown in the above figures, the present disclosure provides an embodiment of an apparatus for determining the usefulness of comment information. The embodiment of the apparatus corresponds to the embodiment of the method shown in FIG. 7, and the apparatus may be applied to various electronic devices.

As shown in FIG. 9, the apparatus 900 for determining the usefulness of comment information in the present embodiment includes a second acquiring unit 901 and an assessing unit 902. The second acquiring unit 902 is configured to acquire a set of comment information; and the assessing unit 903 is configured to input the comment information in the set of comment information into the information assessment model generated by the method for generating an information assessment model to obtain usefulness labels of the comment information.

In some embodiments, the apparatus 900 further includes: a presenting unit, configured to present, based on the usefulness labels of the comment information, the comment information in the set of comment information.

The apparatus for determining the usefulness of comment information according to the present disclosure assesses the usefulness of comment information using a trained information assessment model to obtain a relatively accurate assessment result, which helps to filter out useful comment information as references for decision making.

Hereinafter, referring to FIG. 10, a schematic structural diagram of an electronic device (e.g., the server in FIG. 1) 1000 adapted to implement some embodiments of the present disclosure is shown. The electronic device shown in FIG. 10 is merely an example, and should not limit the function and scope of use of the embodiments of the present disclosure.

Figure 10:
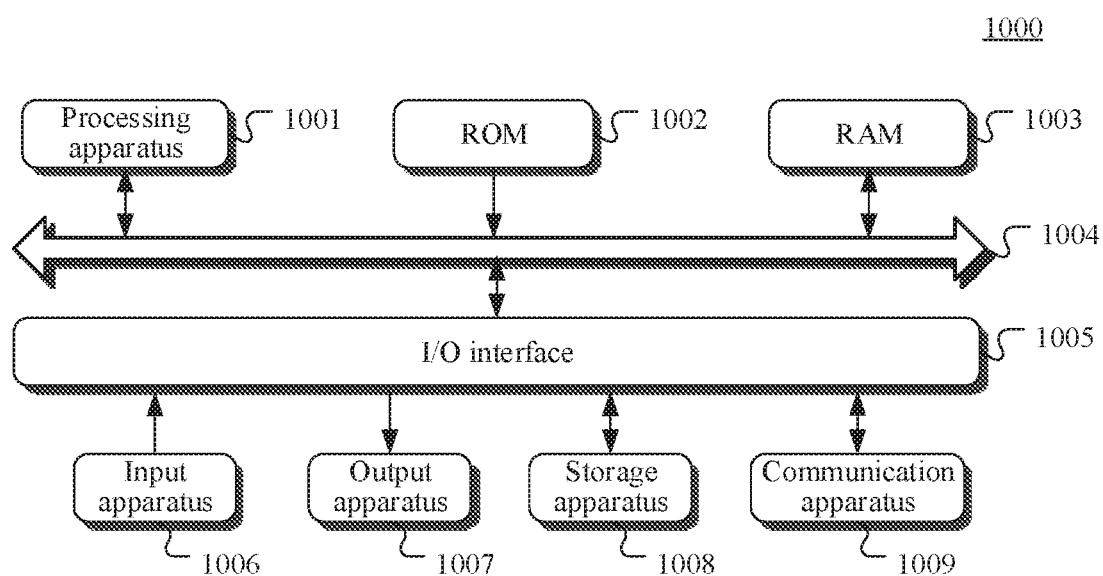
FIG. 10 is a schematic structural diagram of a computer system adapted to implement an electronic device of the embodiments of the present disclosure.

As shown in FIG. 10, the electronic device 1000 may include a processing apparatus (e.g., a central processing unit, a Graphics Processing Unit, etc.) 1001, which may execute various appropriate operations and processes according to a program stored in a read-only memory (ROM) 1002 or a program loaded into a random access memory (RAM) 1003 from a storage apparatus 1008. The RAM 1003 also stores various programs and data required by the operations of the electronic device 1000. The processing apparatus 1001, the ROM 1002, and the RAM 1003 are connected to each other through a bus 1004. An input/output (I/O) interface 1005 is also connected to the bus 1004.

Generally, the following apparatuses may be connected to the I/O interface 1005: an input apparatus 1006 including a touch screen, a touch pad, a keyboard, a mouse, a camera, a microphone, an accelerometer, a gyroscope, or the like; an output apparatus 1007 including a liquid crystal display (LCD), a speaker, a vibrator, or the like; a storage apparatus 1008 including a hard disk or the like; and a communication apparatus 1009. The communication apparatus 1009 may allow wireless or wired communication between the electronic device 1000 and other device to exchange data. Although FIG. 10 illustrates the electronic device 1000 having various apparatuses, it should be understood that all the illustrated apparatuses are not required to be implemented or included. More or less apparatuses may be alternatively implemented or included. Each block shown in FIG. 10 may represent one apparatus or a plurality of apparatuses as required.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication apparatus 1009, or may be installed from the storage apparatus 1008, or may be installed from the ROM 10002. The computer program, when executed by the central processing unit (CPU) 1001, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer-readable medium may be included in the electronic device, or a stand-alone computer-readable medium not assembled into the electronic device. The computer-readable medium stores one or more programs. The one or more programs, when executed by the electronic device, cause the electronic device to: acquire training samples, the training samples including first sample comment information with a usefulness label and second sample comment information without a usefulness label; acquire a predictor model and a discriminator model respectively constructed based on a generation network and a discrimination network in a generative adversarial network, and pre-train the predictor model using the first sample comment information, the predictor model being used to predict a usefulness label of a piece of comment information, the discriminator model being used to discriminate authenticity of a usefulness label; and train the predictor model and the discriminator model by iteratively performing a preset number of training operations, using the trained predictor model as an information assessment model; where a training operation includes: predicting a usefulness label of the second sample comment information using the predictor model, using the usefulness label of the first sample comment information as a real label; using the usefulness label of the second sample comment information as a false label, discriminating authenticity of the usefulness label of the first sample comment information and authenticity of the usefulness label of the second sample comment information by using the discriminator model; iteratively updating, based on an error of the discrimination result of the discriminator model, a parameter of the discriminator model and a reward function, the reward function being associated with the parameter of the discriminator model and a parameter of the predictor model; determining a desired reward of the predictor model based on the reward function and the predictor model, and iteratively updating the parameter of the predictor model based on an error of the desired reward. In some optional implementation, the one or more programs, when executed by the electronic device, cause the electronic device to: acquire a set of comment information; and input the comment information in the set of comment information into the information assessment model generated by the method for generating an information assessment model according to the above embodiments of the present disclosure, to obtain usefulness labels of the comment information.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a first acquiring unit, a preprocessing unit and a training unit, where the names of these units or modules do not in some cases constitute a limitation to such units or modules themselves. For example, the first acquiring unit may also be described as "a unit for acquiring training samples."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are example.

What is claimed is:

1. A method for generating an information assessment model, comprising:
acquiring training samples, the training samples comprising first sample comment information with a usefulness label and second sample comment information without a usefulness label;
acquiring a predictor model and a discriminator model respectively constructed based on a generative network and a discrimination network in a generative adversarial network, and pre-training the predictor model using the first sample comment information, the predictor model being used to predict a usefulness label of a piece of comment information, the discriminator model being used to discriminate authenticity of a usefulness label; and
training the predictor model and the discriminator model by iteratively performing a plurality times of training operations, using the trained predictor model as an information assessment model;
wherein a training operation comprises:
predicting a usefulness label of the second sample comment information using the predictor model; using the usefulness label of the first sample comment information as a real label, using the usefulness label of the second sample comment information as a false label, discriminating authenticity of the usefulness label of the first sample comment information and authenticity of the usefulness label of the second sample comment information by using the discriminator model; iteratively updating, based on an error of the discrimination result of the discriminator model, a parameter of the discriminator model and a reward function, the reward function being associated with the parameter of the discriminator model and a parameter of the predictor model; determining a desired reward of the predictor model based on the reward function and the predictor model, and iteratively updating the parameter of the predictor model based on an error of the desired reward.

2. The method according to claim 1, wherein the discriminating authenticity of the usefulness label of the first sample comment information and authenticity of the usefulness label of the second sample comment information by using the discriminator model comprises:
selecting usefulness labels of an equal number of first sample comment information and second sample comment information, and discriminating authenticity of the selected usefulness labels by using the discriminator model.

3. The method according to claim 1, wherein the error of the discrimination result of the discriminator model comprises a sum of an opposite number of a first cross entropy and an opposite number of a second cross entropy;
the first cross entropy comprises: a cross entropy between a first probability distribution of that the usefulness label of the first sample comment information is a real label and a second probability distribution of that the discriminator model discriminates the usefulness label of the first sample comment information as a real label;
the second cross entropy comprises: a cross entropy between a third probability distribution of that the usefulness label of the second sample comment information predicted by the predictor model is a real label and a fourth probability distribution of that the discriminator model discriminates the usefulness label of the second sample comment information as a real label.

4. The method according to claim 1, wherein when an input of the reward function is the second sample comment information, an output is a result of authenticity discrimination by the discriminator model for the usefulness label of the second sample comment information; and
the determining a desired reward of the predictor model based on the reward function and the predictor model, and iteratively updating the parameter of the predictor model based on an error of the desired reward comprises:
multiplying the reward function by a prediction result of the predictor model to calculate the desired reward, and iteratively updating, in response to determining that the desired reward does not reach a preset reward value condition, the parameter of the predictor model.

5. The method according to claim 4, wherein
when the input of the reward function is the first sample comment information and the discriminator model discriminates the usefulness label of the first sample comment information as a real label, the value of the reward function is 1;
when the input of the reward function is the first sample comment information and the discriminator model discriminates the usefulness label of the first sample comment information as a false label, the value of the reward function is 0.

6. The method according to claim 1, wherein the first sample comment information further has a usefulness index label, the usefulness index label is used to characterize a degree of usefulness, and the predictor model is further used to predict a usefulness index label of a piece of comment information;
the training operation further comprises:
predicting a usefulness index label of the second sample comment information using the predictor model; and
determining a prediction error of the predictor model for the usefulness index label; and
the iteratively updating the parameter of the predictor model based on an error of the desired reward comprises:
iteratively updating the parameter of the predictor model based on the error of the desired reward and the prediction error of the predictor model for the usefulness index label alternately.

7. The method according to claim 1, wherein the method further comprises:
acquiring comment object information corresponding to the training samples; and
the predictor model comprises an information preprocessing network and a classification network;
wherein the information preprocessing network is used to convert a training sample and comment object information corresponding thereto into a mathematical representation, and the classification network predicts usefulness label of the training sample based on the mathematical representation.

8. The method according to claim 7, wherein the information preprocessing network comprises a first bi-directional long short-term memory network and a second bi-directional long short-term memory network;
the first bi-directional long short-term memory network converts the training sample into a first vector representation, and the second bi-directional long short-term memory network converts the comment object information corresponding to the training sample into a second vector representation;
the information preprocessing network integrates, based on an attention mechanism, the first vector representation of the training sample and the second vector representation of the comment object information corresponding thereto into the mathematical representation corresponding to the training sample.

9. A method for determining the usefulness of comment information, comprising:
acquiring a set of comment information; and
inputting the comment information in the set of comment information into the information assessment model generated by the method for generating an information assessment model according to claim 1, to obtain usefulness labels of the comment information.

10. The method according to claim 9, wherein the method further comprises:
presenting, based on the usefulness labels of the comment information, the comment information in the set of comment information.

11. An apparatus for determining the usefulness of comment information, comprising:
at least one processor; and
a memory storing instructions, the instructions when executed by the at least one processor, cause the at least one processor to perform operations, the operations comprising:
acquiring a set of comment information;
inputting the comment information in the set of comment information into the information assessment model generated by the method for generating an information assessment model according to claim 1, to obtain usefulness labels of the comment information; and presenting, based on the usefulness labels of the comment information, the comment information in the set of comment information.

12. An apparatus for generating an information assessment model, comprising:
at least one processor; and
a memory storing instructions, the instructions when executed by the at least one processor, cause the at least one processor to perform operations, the operations comprising:
acquiring training samples, the training samples comprising first sample comment information with a usefulness label and second sample comment information without a usefulness label;
acquiring a predictor model and a discriminator model respectively constructed based on a generation network and a discrimination network in a generative adversarial network, and pre-training the predictor model using the first sample comment information, the predictor model being used to predict a usefulness label of a piece of comment information, the discriminator model being used to discriminate authenticity of a usefulness label; and
training the predictor model and the discriminator model by iteratively performing a plurality times of training operations, using the trained predictor model as an information assessment model;
wherein a training operation comprises:
predicting a usefulness label of the second sample comment information using the predictor model; using the usefulness label of the first sample comment information as a real label, using the usefulness label of the second sample comment information as a false label, discriminating authenticity of the usefulness label of the first sample comment information and authenticity of the usefulness label of the second sample comment information by using the discriminator model; iteratively updating, based on an error of the discrimination result of the discriminator model, a parameter of the discriminator model and a reward function, the reward function being associated with the parameter of the discriminator model and a parameter of the predictor model; determining a desired reward of the predictor model based on the reward function and the predictor model, and iteratively updating the parameter of the predictor model based on an error of the desired reward.

13. The apparatus according to claim 12, wherein the discriminating authenticity of the usefulness label of the first sample comment information and authenticity of the usefulness label of the second sample comment information by using the discriminator model comprises:
selecting usefulness labels of an equal number of first sample comment information and second sample comment information, and discriminating authenticity of the selected usefulness labels by using the discriminator model.

14. The apparatus according to claim 12, wherein the error of the discrimination result of the discriminator model comprises a sum of an opposite number of a first cross entropy and an opposite number of a second cross entropy;
the first cross entropy comprises: a cross entropy between a first probability distribution of that the usefulness label of the first sample comment information is a real label and a second probability distribution of that the discriminator model discriminates the usefulness label of the first sample comment information as a real label;
the second cross entropy comprises: a cross entropy between a third probability distribution of that the usefulness label of the second sample comment information predicted by the predictor model is a real label and a fourth probability distribution of that the discriminator model discriminates the usefulness label of the second sample comment information as a real label.

15. The apparatus according to claim 12, wherein when an input of the reward function is the second sample comment information, an output is a result of authenticity discrimination by the discriminator model for the usefulness label of the second sample comment information; and
the training unit is configured to determine the desired reward of the predictor model in the training operation, and iteratively update the parameter of the predictor model based on an error of the desired reward as follows:
multiplying the reward function by a prediction result of the predictor model to calculate the desired reward, and iteratively updating, in response to determining that the desired reward does not reach a preset reward value condition, the parameter of the predictor model.

16. The apparatus according to claim 15, wherein
when the input of the reward function is the first sample comment information and the discriminator model discriminates the usefulness label of the first sample comment information as a real label, the value of the reward function is 1;
when the input of the reward function is the first sample comment information and the discriminator model discriminates the usefulness label of the first sample comment information as a false label, the value of the reward function is 0.

17. The apparatus according to claim 12, wherein the first sample comment information further has a usefulness index label, the usefulness index label is used to characterize a degree of usefulness, and the predictor model is further used to predict a usefulness index label of a piece of comment information;
the training operation performed by the training unit further comprises:
predicting a usefulness index label of the second sample comment information using the predictor model;
determining a prediction error of the predictor model for the usefulness index label; and
the training unit is configured to iteratively update the parameter of the predictor model in the training operation as follows:
iteratively updating the parameter of the predictor model based on the error of the desired reward and the prediction error of the predictor model for the usefulness index label alternately.

18. The apparatus according to claim 12, wherein the operations further comprises: acquiring comment object information corresponding to the training samples; and
the predictor model comprises an information preprocessing network and a classification network;
wherein the information preprocessing network is used to convert a training sample and comment object information corresponding thereto into a mathematical representation, and the classification network predicts usefulness label of the training sample based on the mathematical representation.

19. The apparatus according to claim 18, wherein the information preprocessing network comprises a first bi-directional long short-term memory network and a second bi-directional long short-term memory network;

the first bi-directional long short-term memory network converts the training sample into a first vector representation, and the second bi-directional long short-term memory network converts the comment object information corresponding to the training sample into a second vector representation;

the information preprocessing network integrates, based on an attention mechanism, the first vector representation of the training sample and the second vector representation of the comment object information corresponding thereto into the mathematical representation corresponding to the training sample.

20. A non-transitory computer-readable medium, storing a computer program thereon, wherein the program, when executed by a processor, causes the processor to implement the Operations, the operations comprise:

acquiring training samples, the training samples comprising first sample comment information with a usefulness label and second sample comment information without a usefulness label;

acquiring a predictor model and a discriminator model respectively constructed based on a generative network and a discrimination network in a generative adversarial network, and pre-training the predictor model using the first sample comment information, the predictor model being used to predict a usefulness label of a piece of comment information, the discriminator model being used to discriminate authenticity of a usefulness label; and training the predictor model and the discriminator model by iteratively performing a plurality times of training operations, using the trained predictor model as an information assessment model;

wherein a training operation comprises:

predicting a usefulness label of the second sample comment information using the predictor model; using the usefulness label of the first sample comment information as a real label, using the usefulness label of the second sample comment information as a false label, discriminating authenticity of the usefulness label of the first sample comment information and authenticity of the usefulness label of the second sample comment information by using the discriminator model; iteratively updating, based on an error of the discrimination result of the discriminator model, a parameter of the discriminator model and a reward function, the reward function being associated with the parameter of the discriminator model and a parameter of the predictor model; determining a desired reward of the predictor model based on the reward function and the predictor model, and iteratively updating the parameter of the predictor model based on an error of the desired reward.

* * * * *